Patented June 26, 1934

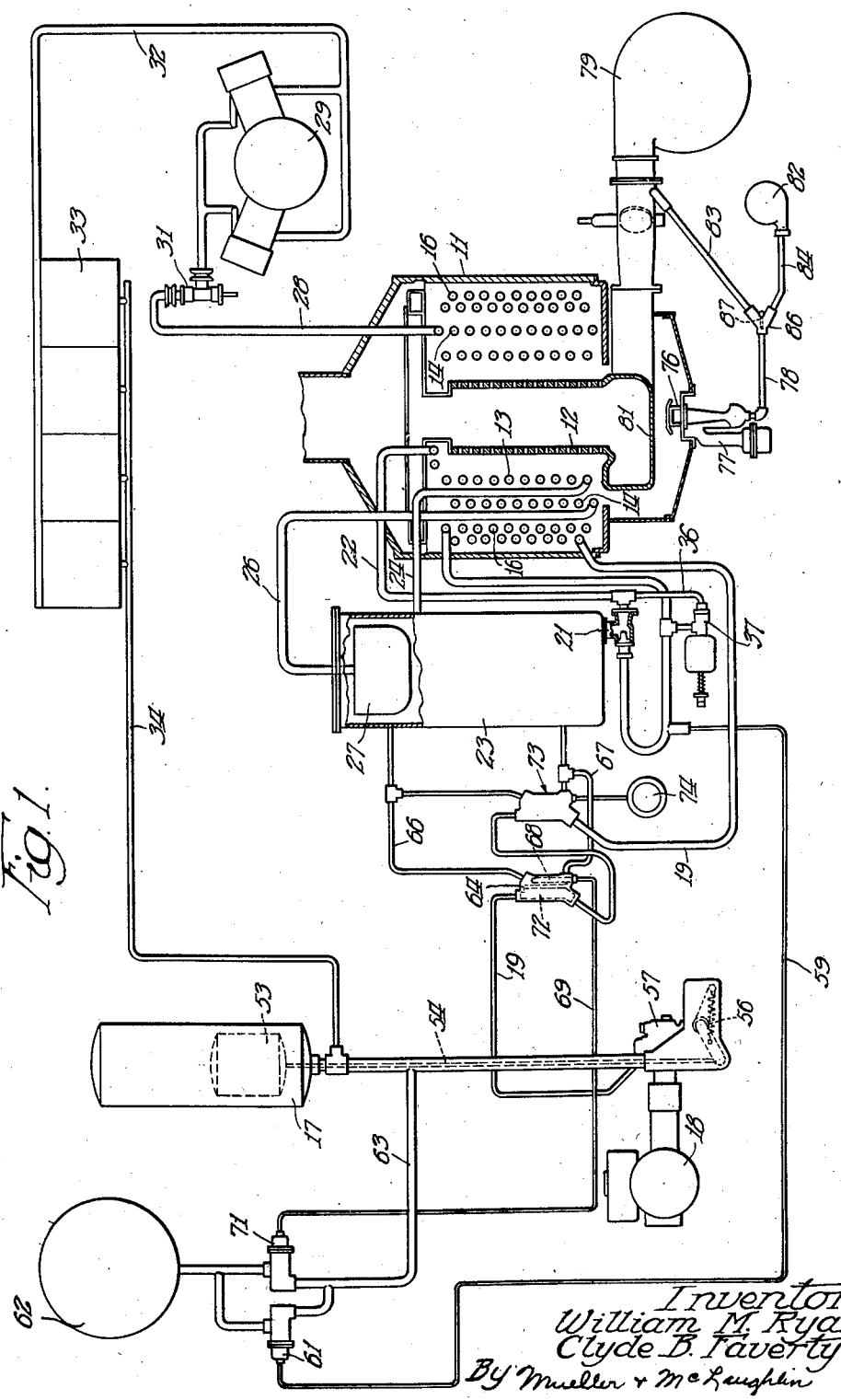

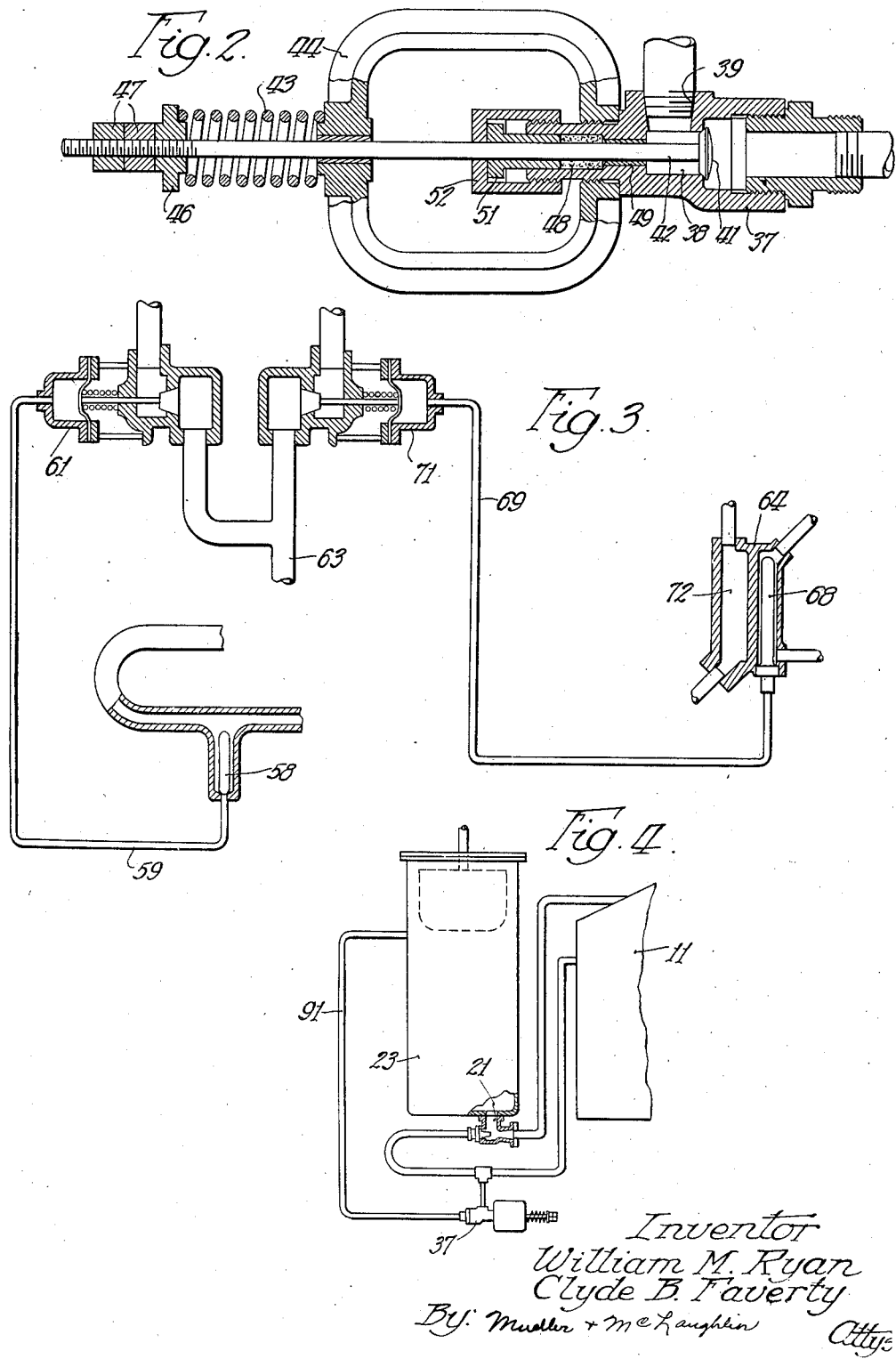

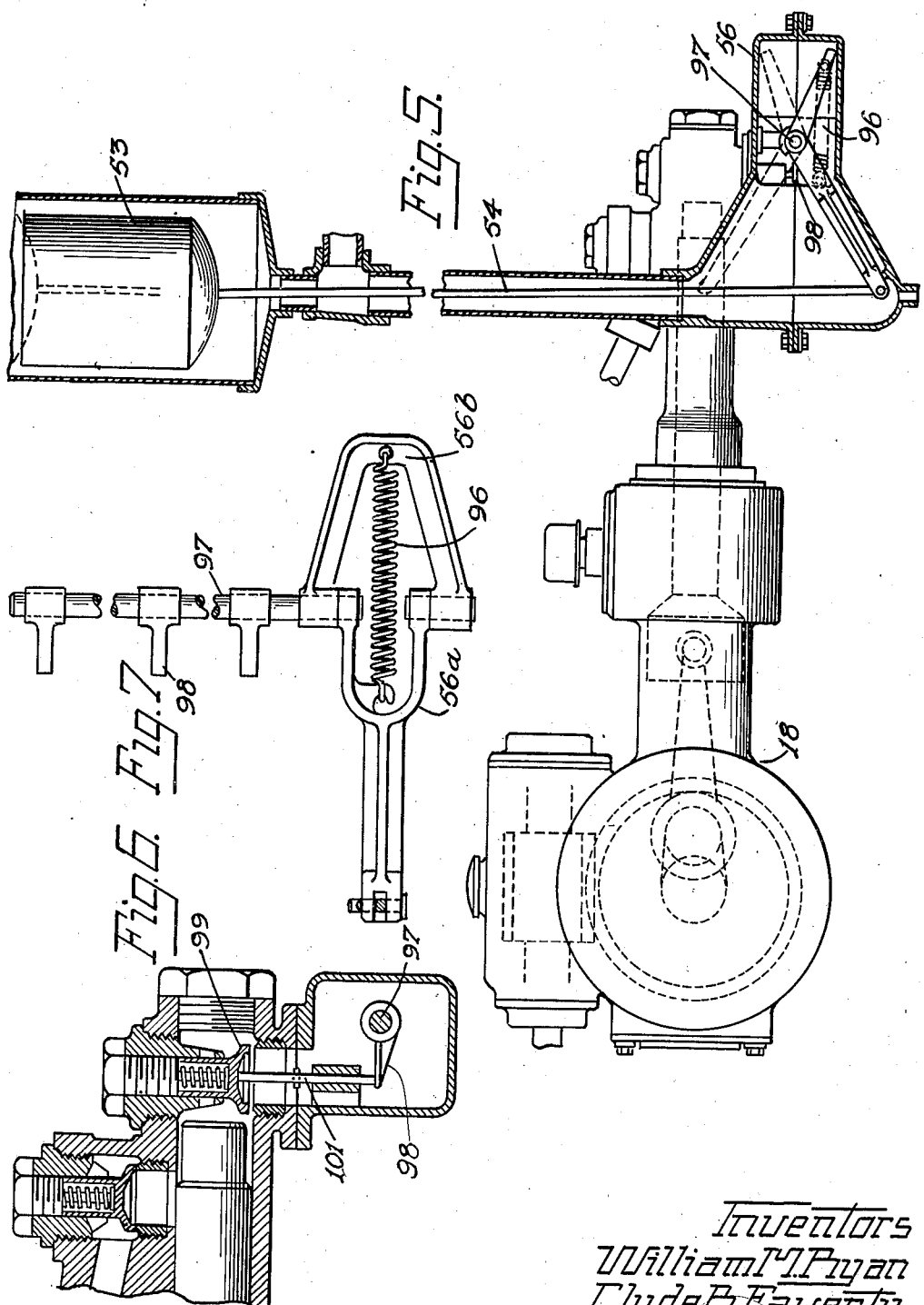

1,964,703

UNITED STATES PATENT OFFICE 1,964,703

STEAM POWER PLANT

William M. Ryan and Clyde B. Faverty, Chicago, Ill., assignors to Ryan Car Company, Chicago, Ill., a corporation of Illinois Application April 28, 1932, Serial No. 608,032

15 Claims. (Cl. 60—107)

Our invention relates in general to steam power plants. It relates more in particular to a high pressure, high capacity, circulating type of boiler of a type sometimes referred to as a recirculating series boiler.

In the past, steam production for power purposes has been carried on commercially by two general types of boilers. There is the type of which the circulating water tube boiler is representative, which depends for its circulation of water, etc., on a hydrostatic head. This type of boiler has advantages in central power stations and the like, but requires a great deal of space, usually a cubic foot of combustion chamber space for each pound of fuel burned per hour. For steam vehicles, and the like, it is not even remotely possible to employ a boiler of this type, due to the space required. In some commercial applications, the space has been limited to a cubic foot for each fifteen pounds of fuel burned per hour, but even this saving does not begin to bring the dimensions of the boiler down to a practical portable size. The so-called series boiler has been used to some extent where the water tube boiler is not practical. In this type of boiler, the water is pumped through a continuous tube which contains a pre-heater section, evaporator section and super-heater section. These sections are connected together to form a continuous tube so that the relative positions of the three sections continually change, with changes in load conditions and the like. This type of boiler is very difficult to control, as the amount of water forced into the coil must be controlled very accurately in accordance with the load conditions.

Suggestions have been made in the past of employing circulating coils having in general the characteristics of the coils used in the series boiler, but so arranged that there is a continuous recirculation and the pre-heater coils (sometimes called the economizer), the evaporator coils and the super-heater coils have a fixed relationship to each other. This type of power plant preferably makes use of a storage and separating drum, and the water pumped from the pre-heater coils to the evaporator coils draws additional water from the drum, thereby recirculating the drum water and maintaining a full supply of water in the evaporator coils under all conditions. There is a great advantage in being able to maintain this full supply of water in the evaporator coils under all conditions. In this type of boiler, there is preferably a high rate of heat transfer and, since the boiler is confined in a small space, only a very high temperature source of heat will give adequate results. An intense blue flame burner is usually used and, unless the evaporator coils are maintained filled with water at all times and ample recirculation insured, tube failure in the evaporator coils may result. If, however, an ample supply of water is maintained with rapid circulation, a condition can be reached in which the heat can be taken away from the tube surface faster than it can be supplied thereto by the burner. This not only results in a gain in efficiency, but in safety as well. To maintain this desirable condition, we have found that every portion of the system must be controlled. This control is preferably automatic, employing pressure conditions as well as heat conditions to get the best control results.

The principal object of our invention is to improve the recirculation series type of boiler.

Another object is to control the pressure in the pre-heater coils.

Another object is to utilize excess pressure in the pre-heater coils for facilitating circulation in the evaporator coils.

Another object is the provision of improved means for supplying water to the system.

Another object is to supply additional water to the system when the temperature of the water in the pre-heater coils is raised.

Another object is to supply additional water to the system when the level of the water in the drum decreases a predetermined amount.

Another object is to combine in the most satisfactory manner the desirable features of the series boiler and the water tube drum type of boiler.

Another object is the utilization of the quick steaming characteristics of the series boiler without sacrificing the simplicity of control of the drum type of construction under varying load.

Another object is to retain to the greatest possible degree the safety of the series boiler, wherein a minimum amount of steam and water is in the system at one time, and further increase such safety characteristics by insuring a plentiful supply of water to prevent local overheating.

Other objects and features of the invention will be apparent from a consideration of the following detailed description taken with the accompanying drawings, wherein Fig. 1 is a more or less schematic representation of the entire system;

Fig. 2 is a detail of a pressure relief and control system;

Fig. 3 is a detail of the water controlling means;

Fig. 4 is a modification, showing the pre-heater relief valve discharging into the drum;

Fig. 5 is a side elevational view partly in section showing the means for controlling the feed water to the pump;

Fig. 6 is an enlarged fragmentary sectional view showing the valve mechanism of the pump; and Fig. 7 is an enlarged fragmentary plan view showing a feature thereof.

In accordance with the general features of the invention, we employ a boiler having three distinct sets of coils, namely, the pre-heater coils, evaporator coils and super-heater coils. Water is continuously pumped from a hot well to the pre-heater coils and thence through an injector which draws water from the bottom of a storage drum to the evaporator coils. The resulting steam mixed with some water is discharged tangentially into the top of the drum, the water separating to the bottom of the drum for recirculating again through the evaporator coils by way of the injector. The steam is taken from the top of the drum, passed through superheater coils and delivered to a prime mover, the exhaust steam going to a condenser and the condensate delivered back to the hot well. Oil (present in the system as a lubricant) and other matter, including water, is prevented from priming over into the super-heater coils by means of a separator placed in the top of the drum. By means not shown herein, the steam pressure in the drum, evaporator coils and super-heater coils is retained within predetermined limits, and, in ordinary operation, the pressure in the pre-heater coils is relatively higher to insure a proper injector action. This difference in pressure is brought about by the small area of the forcing nozzle of the injector, which forcing nozzle is also effective with the Venturi opening into which it discharges, to draw water from the drum. In practice, this difference in pressure may be as much as two-hundred pounds, and, in general, the best results are obtained in the operation of the system when the difference in pressure is between one-hundred and fifty and two hundred pounds. To maintain this pressure difference within proper limits, and for other reasons which will be made clear as the description progresses, we place a pressure relief valve in the pre-heater coils. In the preferred form of the invention, we insert the pressure relief valve between the pre-heater coil and the evaporator coil so that excess pressure in the pre-heater coil will pass around the injector and into the evaporator coil, thus relieving the pre-heater coil and utilizing the excess pressure to increase circulation in the evaporator coil.

We also provide a feed water supply tank with means for supplying additional water to the system when the temperature in the pre-heater coil is raised above a predetermined amount. Similarly, water is automatically transferred from the water supply tank to the system when the level of the water in the storage drum is decreased to a predetermined level.

Referring now to the drawings, we show a casing 11, in the center of which is disposed a blue flame burner 12, and between the blue flame burner and the outside of the casing are evaporator coils 13, super-heater coils 14 and pre-heater coils 16. Water is pumped from a hot well 17 by a pump 18, through a pipe connection 19, to the pre-heater coils. The pre-heater coils discharge through an injector 21 into a pipe connection 22 connected to the evaporator coils. The injector is connected to the bottom of a steam and water separating drum 23, so that as the water, which may contain some steam, is delivered from the pre-heater coils, additional water is drawn from the bottom of the drum and is caused to recirculate through the evaporator coils. A pipe 24 connects from the outlet end of the evaporator coils to the upper portion of the drum, where it discharges preferably tangentially against the sides thereof, the steam portion being confined near the top of the drum and the water portion falling by gravity to the lower part of the drum. The super-heater coils are supplied with steam withdrawn from the top of the drum by a pipe 26 through a suitable separator unit 27 of any suitable construction which prevents solid or liquid matter from passing through with the steam.

From the super-heater coils, the steam is delivered through a pipe 28 to an engine 29, the amount of steam admitted being controlled by a throttle valve 31. The exhaust steam from the engine 29 is delivered through a pipe 32 to a condenser 33, the condensate being collected and distributed through a pipe 34, back to the hot well.

The features described constitute the main parts of the unit or system. The system naturally divides itself into a number of sections in which the pressures vary. From the engine, to and including at least a portion of the condenser, there is a relatively low pressure. From the condenser to the pump, there is substantially no pressure, while the portion of the system between the pump and engine constitutes the main high pressure portion of the system. Of this, the pressure between the pump 18 and the injector 21 is substantially higher than the pressure from the injector to the steam engine. In other words, on the pressure side of the system, we have two distinct pressures, a relatively high pressure in the pre-heater coils and connections thereto, and a relatively lower pressure in the evaporator coils, drum and super-heater coils. This difference in pressure is preferably somewhere between 150 and 200 pounds. By way of example, in practical operation, a pressure of approximately 700 pounds may be carried in the drum, while the pressure in the pre-heater coils will be approximately 900 pounds per square inch.

There are times when there is a tendency for the pressure in the pre-heater coils to be raised considerably above that desired therein. There are several reasons why this pressure should not be allowed to increase beyond certain limits and safety precautions alone would warrant keeping this pressure down. In order to control the pressure in the pre-heater coils, we provide a by-pass 36 around the injector 21 and between the pre-heater coils and the evaporator coils. This by-pass, shown more in detail in Fig. 2, bleeds some of the fluid in the pre-heater coils directly into the evaporator coils without going through the injector. This causes an immediate decrease in the pressure in the pre-heater coils, but under no circumstances can it cause the pressure to decrease sufficiently to interrupt the injector action. The greater portion of the fluid in the pre-heater coils is water and the relatively high pressure may be due in part to a vaporization of a portion of this water into steam. When the relief valve is open, therefore, an additional amount of water is delivered directly to the evaporator coils than would normally be present. This adds to the amount of water in the evaporator coils and also greatly increases the activity of the water passing therethrough, thus serving to increase the rate of heat transfer.

Reference may now be had to Fig. 2 in which the details of one embodiment of the relief valve are disclosed. The housing 37 has a chamber 38 to which the pre-heater coils are connected through an inlet 39. One side of the chamber 38 is open and forms a valve seat, normally closed by a valve 41. On the opposite side of the valve seat there is a chamber adapted to be connected by suitable means, such as shown, to the evaporator coils. The valve 41 has a valve stem 42 and the differential area on the two sides of the valve may be sufficient to balance it in such a way as to maintain the valve in a closed position when the pressure on the stem side is somewhat greater than the pressure on the opposite side of the valve. In order to positively close the valve, however, we provide a compression spring 43, one end of which engages a yoke 44 which engages the housing 37 and the other end of the spring engaging against a cap 46 threaded on an extension of the valve stem and adjusted by adjustable nuts 47, threaded on the valve stem. It is obvious, therefore, that any suitable pressure may be applied to the valve stem to hold the valve 41 against its seat. The valve stem is packed by any suitable packing material 48 disposed between bronze bushings 49 and 51. A packing nut 52 is removable for the purpose of changing the packing.

It will be understood that the pump 18 pumps water from the hot well 17 into the pre-heater coils. Should the supply of water in the hot well fail, however, it is not desirable that the pump continue its pumping operation, because it would thereby pump air into the system in place of water, which would be objectionable for many reasons. This is avoided by means of a float 53 in the hot well, which has a rod 54 extending down to an over-center type of switch mechanism 56, which controls intake valves contained in a housing 57. The one manner in which this control is carried out is shown in Figs. 5 to 7, inclusive. The over-center type of switch mechanism 56 includes the two members 56a and 56b which are interconnected by a spring 96. The member 56b is keyed to a transverse shaft 97 which carries a plurality of valve controlling members 98, the number employed being equal to the number of intake valves in the pump. Each intake valve 99 has a rod extension 101 (Fig. 6) and the rod 101 is adapted to be engaged by one of the controlling members 98 as the figure shows.

In the operation of this portion of the mechanism when the float 53 is at an upper position, the parts 56a and 56b assume the position shown in dotted lines in Fig. 5. When now the level of water in the hot well 71 is lowered, the float 53 gradually drops down bringing the rod 54 with it. This creates an additional tension in the spring 96 until the parts of the members 56a and 56b to which the spring is attached are past center; that is, below the axis of shaft 97. When this occurs, the switch is moved to the position shown in full lines in Fig. 5 with a snap action which causes each member 98 to engage one of the rods 101, thus raising the intake valve against the action of its spring and holding it open. The result is that even though the pump may continue its operation, the intake valve or valves are held open and sufficient pressure cannot be developed in the pump cylinder to force any fluid through the spring pressed outlet valve. The water will merely swish back and forth through the intake valves. When the intake valves are held open, for example, the water will merely swish back and forth between the valves and will not pump, even though the pump continues to operate. This is one way in which the pumping of air is avoided, but any other means may be employed for accomplishing the same result. If the amount of water in the hot well fails, there will be no additional water supplied to the pre-heater coils and these coils are apt to overheat.

An unusually high temperature may be contained in the coils for some additional reason, but, in any event, it is clear that the temperature may be reduced by pumping more water into them. Accordingly, we provide a control for delivering additional water to the system when the temperature of the fluid in the pre-heater coils is raised beyond a predetermined amount. This includes a bulb 58 exposed to the fluid in the pre-heater coils and connected by a line 59 to a diaphragm type of valve 61. The bulb 58 and line 59 are filled with material which expands with heat, as, for example, mercury. When the heat in the pre-heater coil is raised to cause a sufficient expansion of the fluid in the bulb 58, it causes the valve 61 to open, thereby allowing water from the supply tank 62 to be delivered through the pipe system shown, including a pipe 63, to the hot well. The supply tank 62 is supported above the hot well so that the water will flow in by gravity. Other means of insuring the flow of water from the drum 62 to the hot well may, of course, be employed.

We also provide safety means for automatically delivering an additional supply of water to the system when the level of the water in the drum decreases. This is brought about in the following manner. A chamber 64 disposed slightly below the normal water line of the drum 23 is connected at its top with a pipe 66 to the upper or steam portion of the drum, and at its bottom by a pipe 67 connected to the lower or water portion of the drum. Within this chamber is disposed a bulb 68 connected by a line 69 to a diaphragm type of valve 71. The water supply line from the pump passes through a chamber 72 disposed adjacent to the chamber 64 and in the same metal body. On account of the position of the chamber, the bulb 68 is normally covered with water and the continuous movement of feed water through the chamber 72 has a cooling effect on the bulb 68. If, however, the supply of water in the drum 23 falls so low as to uncover a major portion of the bulb, it will be surrounded with steam which will not be cooled by the water circulating through the chamber 72, and will cause an expansion of the fluid in the bulb with a resulting opening of the diaphragm valve 71, thereby allowing water to pass from the supply tank 62 to the hot well. It is evident, of course, also, that if the feed water ceases flowing through the chamber 72 for any length of time, there may be a sufficient temperature increase in the bulb 68 to cause the valve 71 to open. However, mere failure of a water supply in the hot well, which would be shown by the pump ceasing to operate, will effect the bulb 58, previously described, in most cases probably before there would be a result due to the expansion of the fluid in the bulb 68.

We also provide visual means for indicating the condition of the water supply in the drum. A separate unit 73, similar to that described in the preceding paragraph, has a chamber communicating with the top and bottom of the drum and a chamber communicating with the feed water supply. By a similar pressure mechanism, a suitable gauge 74 may be made to operate and so disclose, by visible means to the operator, the tendency of the water supply in the drum. This is a safety precaution which may, under certain circumstances, prove a valuable adjunct to the automatic control.

As to the burner mechanism, we employ, in addition to the main burner 12, a small pilot burner 76 to which a combustible mixture is supplied by a vaporizing unit 77. Fuel is delivered to the vaporizing unit in a suitable way and air is delivered thereto by a pipe 78. A large blower 79 supplies air to the main burner and fuel is supplied for mixture with the air by suitable means. It will be seen that the position of the pilot burner maintains a surface 81 at a relatively high temperature to facilitate vaporizing of the fuel delivered to the main burner with the air. A small blower 82 is provided for delivering air to the pilot burner. We may utilize the main blower also for delivering air to the pilot burner, in which case some of the air is tapped off and delivered through a pipe 83 to the pipe 78. A pipe 84 from the small blower also connects to the pipe 78, both the pipes 83 and 84 delivering to a shut-off device 86, having a flap type of valve 87 which is adapted to close off either the pipe 83 or the pipe 84. By this means, we can utilize the small blower for starting or when the pilot burner only is in operation. When the main burner is in operation, however, the blower 79 may be utilized alone to supply air to both burners.

In general, the operation of the system, as shown in Fig. 1, can be understood from the preceding description. It should be remembered that additional controls may and preferably are used in the complete system, particularly for controlling the fuel supply and operation of the burner, these controls being operated in part by the condition of the steam pressure, temperature in various parts of the system, and the like. We have shown in the present embodiment, therefore, only so much of the boiler system as directly relates to such system and as the system exemplifies the principles of our invention.

As heretofore pointed out, the pressure of the fluid in the pre-heater or economizer portion of the system normally is from 150 to 200 pounds greater than the pressure in the steam generating portion of the system. It may be said, however, that this difference in pressure is merely illustrative, as the pressure may be controlled within any suitable limits in either portion of the system. When the system is started up, the water pump 18 is not operated, because steam is not being generated rapidly enough to evaporate the water if it is continually fed to the system. In starting, therefore, there is substantially little circulation through the system, except insofar as the circulation is controlled by the means described in our preceding application, Serial No. 519,491, filed March 2, 1932. With this condition prevailing, however, there may be some generation of steam in the pre-heater coils, or there may be some shortage of water in the pre-heater coils, which will cause the temperature thereof to be raised. In either event, when the cold water is then pumped into the pre-heater coils on the starting of the pump, there will be an immediate generation of steam, which will tend to raise the pressure in the pre-heater coils above that desired. At such a time, the relief valve, or by-pass 36, will be opened, thus relieving the pressure and allowing a free movement of the incoming water through the pre-heater coils and also passing some of the fluid from the pre-heater coils into the evaporator coils to increase the circulation in these coils. During the operation of the system, under certain conditions, there may be a momentary shortage of water in the pre-heater coils, which would have substantially the same result as the condition occasioned in starting and the same by-passing effect is obtained. If the system is working for a long period at maximum capacity, there may, at times, be a slight opening of the valve 41 in the by-pass, which will bleed relatively continuously a small amount of the fluid in the pre-heater coils into the evaporator coils. It will be clear, therefore, that the by-pass arrangement not only maintains a substantially constant pressure in the pre-heater or economizer portion of the system, but it also acts in other capacities, principally to increase the circulation in both the pre-heater and evaporator coils.

In the main embodiment hereinabove described, the excess pressure in the pre-heater or economizer section of the system is relieved into the evaporator coils. Although particular advantages are achieved by this particular arrangement, the control of the pressure in the pre-heater section can be embodied in our construction. For example, fluid may be delivered from the pre-heater section to relieve the pressure therein to any portion of the evaporator section. The fluid may be vented to atmosphere, but as a general rule this would not be advisable due to the fact that the system is preferably operated on the closed principle in which the exhaust steam is condensed and delivered back to the pre-heater section.

Fig. 4 shows another embodiment in which the pre-heater section is vented into the evaporator section. In this form, instead of delivering by-passed fluid from the pre-heater coils to the evaporator coils, we deliver it directly to the drum 23 through a pipe 91. While this embodiment has no direct effect in increasing the circulation of fluid through the evaporator coil, it does have a desirable effect in increasing the water level in the drum, so that there is an ample supply thereof for recirculation by means of the injector. We show the pipe 91 discharging into the drum above the normal water line thereof. This discharge with equal facility can be made directly into the water portion of the drum, as will be readily understood.

We have described our invention in detail to permit those skilled in the art to practice the same, but it is obvious that our invention is not limited to the specific form shown, except within the purview of the attached claims.

What we claim is new and desire to protect by Letters Patent of the United States is:

1. In a recirculating series boiler, a drum adapted to contain a supply of water, an evaporator coil, a pre-heater coil discharging into said evaporator coil, injector means at the point of discharge of the pre-heater coil into the evaporator coil to withdraw additional water from the drum for delivery into the evaporator coil, and means for by-passing fluid from the pre-heater coil to the evaporator coil.

2. In a recirculating series boiler, a drum adapted to contain a supply of water, an evaporator coil, a pre-heater coil discharging into said evaporator coil, injector means at the point of discharge of the pre-heater coil into the evaporator coil to withdraw additional water from the drum for delivery into the evaporator coil, and means for by-passing fluid from the pre-heater coil to the evaporator coil when the pressure in the pre-heater coil is raised a predetermined amount above the pressure in the evaporator coil.

3. In a recirculating series boiler, a pre-heater coil, an evaporator coil, a steam and water separating drum receiving fluid from the evaporator coil, an injector between the pre-heater coil and evaporator coil adapted to deliver fluid from the pre-heater coil to said evaporator coil and with-draw fluid from the drum for recirculation in the evaporator coil, and means for discharging fluid directly from the pre-heater coil to the evaporator coil without passing through said injector.

4. In a recirculating series boiler, a pre-heater coil, an evaporator coil, a steam and water separating drum rereiving fluid from the evaporator coil, an injector between the pre-heater coil and evaporator coil adapted to deliver fluid from the pre-heater coil to said evaporator coil and with-draw fluid from the drum for recirculation in the evaporator coil, and means for discharging fluid directly from the pre-heater coil to the evaporator coil without passing through said injector when the pressure in the pre-heater coil is increased above a pre-determined amount.

5. In a recirculating series boiler, a pre-heater coil, an evaporator coil, a steam and water separating drum receiving fluid from the evaporator coil, an injector between the pre-heater coil and evaporator coil adapted to deliver fluid from the pre-heater coil to said evaporator coil and with-draw fluid from the drum for recirculation in the evaporator coil, means for discharging fluid directly from the pre-heater coil to the evaporator coil without passing through said injector, and means for controlling said discharging means to cause the same to operate when the pressure in the pre-heater coil reaches a predetermined amount.

6. In a recirculating series boiler, a steam evaporator system, including an evaporator coil, an economizer system including a pre-heater coil, and means for limiting the pressure within said pre-heater coil.

7. In a recirculating series boiler, a steam evaporator system, including an evaporator coil, an economizer system, including a pre-heater coil, and means for increasing the circulation in the evaporator coil when the pressure in the pre-heater coil is raised above a predetermined value.

8. In a recirculating series boiler, a steam evaporator system, including an evaporator coil, an economizer system, including a pre-heater coil, and means for increasing the circulation in both the pre-heater coil and evaporator coil when the the pressure in the pre-heater coil increases a predetermined amount.

9. In a recirculating series boiler system, a prime mover, an evaporator system adapted to supply steam to the prime mover, a condenser adapted to receive exhaust steam from the prime mover and condense the same, an economizer system including a water pre-heater coil, means for delivering the water from the pre-heater coil to the evaporator system, means for forcing the condensate from the condenser into the pre-heater coil, a water supply tank, and means for adding additional water to the system from the water supply tank when the temperature of the fluid in the economizer system is raised.

10. In a recirculating series boiler system, a prime mover, an evaporator system adapted to supply steam to the prime mover, a condenser adapted to receive exhaust steam from the prime mover and condense the same, an economizer system including a water pre-heater coil, means for delivering the water from the pre-heater coil to the evaporator system, means for forcing the condensate from the condenser into the pre-heater coil, and means for adding additional water to the system when the temperature of the fluid in the pre-heater coil is raised, said means including a water supply tank, a pressure regulated valve for admitting water from the tank to the pump, and means exposed to the fluid in the pre-heater coil for actuating said valve.

11. In a recirculating series boiler system, a pre-heater coil, an evaporator coil, a steam and water separating drum connected to receive fluid discharged from the evaporator coil, said steam and water separating drum adapted normally to contain a predetermined supply of water, an injector disposed between the pre-heater coil and evaporator coil and connected to the drum to withdraw water from said drum for recirculation through the evaporator coil, a prime mover, means for delivering steam from the drum to the prime mover, a condenser receiving exhaust steam from the prime mover, a hot well for receiving condensate from the condenser, means for pumping the condensate from the hot well into the pre-heater coil, and means for delivering additional water to the hot well when the amount of water in the drum decreases below said predetermined amount.

12. In a recirculating series boiler system, a pre-heater coil, an evaporator coil, a steam and water separating drum connected to receive fluid discharged from the evaporator coil, said steam and water separating drum adapted normally to contain a predetermined supply of water, an injector disposed between the pre-heater coil and evaporator coil and connected to the drum to withdraw water from said drum for recirculation through the evaporator coil, a prime mover, means for delivering steam from the drum to the prime mover, a condenser receiving exhaust steam from the prime mover, a hot well for receiving condensate from the condenser and a pump for forcing water from the hot well into the pre-heater coil, means for delivering additional water to the hot well when the amount of water in the drum decreases below said predetermined amount, said means including a chamber having connections above and below the drum, a second chamber disposed in contact with the first chamber through which condensate is pumped from said hot well to the pre-heater coil, a water supply tank, a connection from the water supply tank to the hot well, a pressure regulated valve normally closing said connection, and expansion means disposed in said first mentioned chamber and having connections for controlling said pressure regulated valve, connections being provided between the expansion means and valve that when the water level in the drum decreases to permit said expansion means to be exposed to steam, such expansion means will expand due to increased temperature and actuate said valve.

13. In a recirculating series boiler, a pre-heater section, an evaporator section, a restricted passageway between the pre-heater section and evaporator section, said pre-heater section normally discharging into said evaporator section through said restricted passageway, and means other than said restricted passageway for limiting the pressure in the pre-heater section to a predetermined amount above the pressure in the evaporator section.

14. In a recirculating series boiler, a pre-heater section, a pump connected to force water under pressure into the pre-heater section, an evaporator section including a drum and an evaporator coil, a restricted passageway between the pre-heater section and evaporator section whereby pressure in the pre-heater section is maintained higher than the pressure in the evaporator section, and means in addition to said restricted passageway for discharging fluid from the pre-heater section into the evaporator section.

15. In a recirculating series boiler, a pre-heater section, an evaporator section, a restricted passageway through which fluid is delivered from the pre-heater section to the evaporator section, and means for venting the pre-heater section when the pressure therein is increased to a predetermined amount.

WILLIAM M. RYAN.
CLYDE B. FAVERTY.